US006918866B2

(12) United States Patent
Miyamori et al.

(10) Patent No.: US 6,918,866 B2
(45) Date of Patent: Jul. 19, 2005

(54) CONDUCTIVE ROLL

(75) Inventors: Shiro Miyamori, Ishikawa-Gun (JP); Yasuyuki Hayasaki, Komaki (JP); Masanari Umeda, Kani-Gun (JP); Kenichi Tsuchiya, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/633,910

(22) Filed: Aug. 4, 2003

(65) Prior Publication Data

US 2004/0062940 A1 Apr. 1, 2004

(30) Foreign Application Priority Data

Sep. 30, 2002 (JP) ....................................... 2002-285375

(51) Int. Cl.[7] ................................................ F16C 13/00
(52) U.S. Cl. ........................................... 492/56; 492/49
(58) Field of Search .................. 492/56, 49; 428/36.91, 428/375, 383; 399/176

(56) References Cited

U.S. PATENT DOCUMENTS

| | | | | |
|---|---|---|---|---|
| 5,597,652 A | | 1/1997 | Utsunomiya et al. | |
| 5,669,053 A | | 9/1997 | Hashizume et al. | |
| 5,804,309 A | * | 9/1998 | Itoh et al. | 428/375 |
| 6,190,295 B1 | * | 2/2001 | Kawano et al. | 492/56 |
| 6,283,904 B1 | * | 9/2001 | Itoh et al. | 492/56 |
| 6,340,528 B1 | | 1/2002 | Hsieh et al. | |
| 6,481,707 B2 | * | 11/2002 | Matsuo et al. | 271/109 |
| 2002/0013203 A1 | * | 1/2002 | Hattori et al. | 492/53 |
| 2002/0058189 A1 | | 5/2002 | Tanaka et al. | |

FOREIGN PATENT DOCUMENTS

| | | | |
|---|---|---|---|
| JP | 06-058325 | | 3/1994 |
| JP | 08-190263 | | 7/1996 |
| JP | 2002-40755 A | * | 2/2002 |
| JP | 3320001 | | 6/2002 |

* cited by examiner

*Primary Examiner*—Marc Jimenez
(74) *Attorney, Agent, or Firm*—Burr & Brown

(57) ABSTRACT

An electrically conductive roll includes a shaft body and at least a conductive elastic layer formed by extrusion on an outer circumferential surface of the shaft body. The conductive elastic layer is formed from at least one conductive rubber composition which includes a rubber material, a thermoplastic resin having crosslinkable double bonds and a melting point in a range from 40° C. to 100° C., and at least one conductive agent. The thermoplastic resin is included in an amount of 5 to 50 wt. % of a total amount of the rubber material and the thermoplastic resin.

11 Claims, 1 Drawing Sheet

CONDUCTIVE ROLL

This application claims the benefit of Japanese Patent Application No. 2002-285375 filed on Sep. 30, 2002, the entirety of which is incorporated herein by reference.

BACKGROUND OF THE INVENTION

1. Field of the Invention

The present invention relates to an electrically conductive roll such as a charging roll, a developing roll, or a transferring roll, for use in an electrophotographic copying machine, printer, etc.

2. Discussion of Related Art

Electrically conductive rolls such as a charging roll, a developing roll, and a transferring roll are used in an electrophotographic copying machine, printer, etc., so that those rolls perform respective functions.

For instance, the charging roll is used in a roll charging method wherein a photosensitive drum on which an electrostatic latent image is formed is charged by the charging roll. Described more specifically, in the roll charging method, the photosensitive drum and the charging roll are rotated such that the charging roll to which a voltage is applied is held in pressing contact with an outer circumferential surface of the photosensitive drum, to thereby charge the outer circumferential surface of the photosensitive drum. The developing roll carries a layer of toner on its outer circumferential surface. The photosensitive drum and the developing roll are rotated such that the developing roll is held in contact with the outer circumferential surface of the photosensitive drum on which the electrostatic latent image is formed, so that the toner is transferred from the developing roll onto the photosensitive drum, whereby the latent image is developed into a toner image. The transferring roll transfers the toner image developed by the toner supplied from the developing roll, onto a recording medium such as a sheet of paper.

Such conductive rolls include a suitable shaft body (core metal) as an electrically conductive body and a conductive elastic layer formed on an outer circumferential surface of the shaft body and provided by a rubber layer having a relatively low hardness. The conductive rolls further include, as needed, a resistance adjusting layer and a protective layer formed in the order of description on an outer circumferential surface of the conductive elastic layer. The conductive rolls are needed to have high degrees of surface smoothness and dimensional accuracy for assuring that the conductive rolls are held in uniform contact with the photosensitive drum, etc.

The conductive rolls described above are conventionally produced, for example, (1) by using a cylindrical mold as disclosed in Patent Document 1 (JP-A-8-190263) or (2) by using an extruder as disclosed in Patent Document 2 (Japanese Patent No. 3320001). Described in detail, in the method (1), a shaft body is positioned in a mold cavity of the cylindrical mold such that the shaft body is positioned at the center of the mold cavity. An unvulcanized rubber composition for a conductive elastic layer is introduced into the mold cavity such that an annular space of the mold cavity around the shaft body is filled with the unvulcanized rubber composition. Thereafter, the unvulcanized rubber composition is vulcanized, so that the elastic layer is formed integrally on the outer circumferential surface of the shaft body. As needed, a resistance adjusting layer, a protective layer, etc., are formed in this order on the outer circumferential surface of the elastic layer. In the method (2), a tubular body (cylindrical body) formed of an unvulcanized rubber composition for a conductive elastic layer is fabricated by using the extruder. A shaft body is disposed within an inner bore of the tubular body. The tubular body formed of the unvulcanized rubber composition is vulcanized, so that the elastic layer is formed integrally on an outer circumferential surface of the shaft body. As needed, a resistance adjusting layer, a protective layer, etc., are formed in this order on the outer circumferential surface of the elastic layer.

The conductive roll produced according to the above-described method (1) has high degrees of surface smoothness and dimensional accuracy. The method (1), however, needs a mold having a mold cavity which has a configuration corresponding to that of the integral structure consisting of the shaft body and the elastic layer, undesirably suffering from low efficiency and high cost of manufacture of the conductive roll.

The above-described method (2) effectively reduces the required time and cost of manufacture of the conductive roll. Where the elastic layer is formed according to the method (2) by using a rubber composition having a relatively large die swell value which represents a ratio of expansion of the rubber upon extrusion from a die of the extruder, the rubber composition is not extruded with high efficiency. In this case, the surface of the extruded tubular body that gives the elastic layer is not sufficiently smoothed, in other words, the surface is undesirably rough with concavities and convexities. In addition, the extruded tubular body, and accordingly the elastic layer does not have a high degree of dimensional accuracy. Described more specifically, if a conductive roll whose outer surface is rough is used as the charging roll, the toner adheres to the outer surface of the roll, making it impossible to uniformly charge the outer circumferential surface of the photosensitive drum. In this case, an image reproduced on a sheet of paper by using such a charging roll has a poor quality, that is, the entirety of the reproduced image is faded, or lines appear as a part of the reproduced image. If a conductive roll which does not have a high degree of dimensional accuracy is used as the charging roll, the roll is not held in uniformly pressed contact with the photosensitive drum, so that the outer circumferential surface of the photosensitive drum is not uniformly charged. In this case, lines undesirably appear as a part of the reproduced image in a transverse direction of the sheet of paper. Accordingly, where the conductive elastic layer of the roll is formed according to the above-described method (2), i.e., by extrusion, the outer surface of the roll needs to be ground or polished for increasing the degrees of surface smoothness and dimensional accuracy.

The conductive roll whose conductive elastic layer has a high degree of dimensional accuracy may be formed with reduced time and cost of manufacture if a resin composition having a relatively small die swell value is used for extrusion, in place of the above-described rubber composition having a relatively large die swell value. The elastic layer formed of the resin, however, is inferior in terms of a resistance to permanent set to the elastic layer formed of the rubber. Accordingly, the conductive roll having such an elastic layer formed of the resin is not held in uniformly pressed contact with the photosensitive drum with high stability. Accordingly, the outer circumferential surface of the photosensitive drum cannot be uniformly charged, so that a reproduced image may undesirably have a poor quality.

DISCLOSURE OF THE INVENTION

The present invention was made in view of the background art situations described above. It is therefore an object of this invention to provide an electrically conductive roll whose conductive elastic layer is formed with high stability by extrusion to assure improved efficiency and reduced cost of manufacture of the conductive roll, and which exhibits high degrees of surface smoothness, dimensional accuracy, and resistance to permanent set.

The object indicated above may be achieved according to a principle of the present invention, which provides an electrically conductive roll which includes a shaft body and which includes at least a conductive elastic layer formed by extrusion on an outer circumferential surface of the shaft body, wherein the conductive elastic layer is formed of a conductive rubber composition which includes a rubber material, a thermoplastic resin having crosslinkable double bonds and a melting point in a range from 40° C. to 100° C., and at least one conductive agent, the thermoplastic resin being included in an amount of 5 to 50 wt. % of a total amount of the rubber material and the thermoplastic resin.

In the present electrically conductive roll constructed as described above, the conductive elastic layer is formed of the rubber composition which is obtained by adding, to a rubber material, at least one conductive agent which gives required conductivity to the elastic layer, and a suitable amount of a thermoplastic resin having crosslinkable double bonds and a melting point in a range from 40° C. to 100° C. Owing to the presence of the thermoplastic resin in the rubber composition, the viscosity and the die swell value of the rubber composition are effectively reduced upon extrusion, and the fluidity of the rubber composition is advantageously increased. Accordingly, the rubber composition can be extruded with high stability, and the surface of the extruded tubular body that gives the conductive elastic layer is given a high degree of smoothness, so that the conductive roll exhibits high degrees of surface smoothness and dimensional accuracy required by the conductive roll.

The thermoplastic resin included in the present rubber composition for the conductive elastic layer has the crosslinkable double bonds, so that the thermoplastic resin can be co-crosslinked with the rubber material by a vulcanizing agent (crosslinking agent) added to the rubber composition for vulcanizing the rubber material. Accordingly, the present arrangement effectively avoids a deterioration of the resistance to permanent set generally experienced in a conductive roll whose elastic layer is formed of the resin. Thus, the conductive roll constructed according to the present invention exhibits an excellent resistance to permanent set.

In one preferred form of the conductive roll according to the present invention, the rubber material is selected from the group consisting of a nitrile rubber (NBR), an epichlorohydrin rubber (ECO), and a mixture thereof. Each of those rubber materials is a polar rubber material, and is less likely to compatible with the thermoplastic resin described above, so that the rubber material and the thermoplastic resin forms an island-sea structure wherein the thermoplastic resin is dispersed in a matrix of the rubber material. According to this arrangement, the conductivity of the conductive elastic layer is prevented from being adversely influenced.

In another preferred form of the conductive roll according to the present invention, the rubber composition further includes silica. Owing to the addition of the silica to the rubber composition, the surface smoothness of the conductive elastic layer can be further improved.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
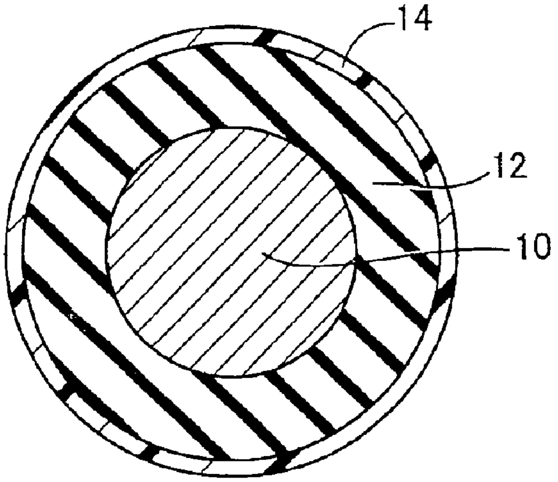
FIG. 1 is a transverse cross-sectional view showing one embodiment of an electrically conductive roll of the present invention.

Referring to FIG. 1, there is shown one representative example of a roll structure employed in a conductive roll according to the present invention. In FIG. 1, the reference numeral 10 denotes a bar- or pipe-shaped conductive shaft body (metal care) formed of metal such as a stainless metallic material. On an outer circumferential surface of the shaft body 10, there is provided a conductive elastic layer 12. Further, a protective layer 14 having a suitable thickness is formed radially outwardly of the conductive elastic layer 12.

In the present conductive roll, the conductive elastic layer 12 provided by a rubber elastic body which has electric conductivity and relatively low hardness is formed by extrusion on the outer circumferential surface of the shaft body 10. The present invention is characterized in that the conductive elastic layer 12 is formed by using a conductive rubber composition in which a suitable amount of a thermoplastic resin is included.

Described more specifically, the rubber composition for the conductive elastic layer 12 is obtained by adding, to a rubber material which will be described later, at least one conductive agent such as an electron-conductive agent or an ion-conductive agent conventionally used for giving the conductivity, and a thermoplastic resin having crosslinkable double bonds and a melting point in a range from 40° C. to 100° C. such that the amount of the thermoplastic resin is held in a range of 5 to 50 wt. % of a total amount of the rubber material and the thermoplastic resin. The thermoplastic resin described above is softened upon extrusion of the rubber composition, so that the viscosity and the die swell value of the rubber composition are suitably lowered, and the fluidity of the rubber composition is increased. Accordingly, the rubber composition can be extruded with high stability, and the surface of the extruded elastic layer 12 has sufficiently smoothed. Therefore, the conductive elastic layer 12 has high degrees of surface smoothness and dimensional accuracy. The thermoplastic resin is co-crosslinked with the rubber material by a vulcanizing agent (crosslinking agent) such as sulfur that is added to the rubber composition for vulcanizing the rubber, so that the resistance to permanent set of the conductive roll can be effectively increased.

The rubber material as one constituent element of the rubber composition for the conductive elastic layer 12 is suitably selected from various known rubber materials which permit the conductive roll to have a low degree of hardness or a high degree of flexibility required by the conductive roll. It is preferable to use a polar rubber material such as a nitrile rubber (NBR), an epichlorohydrin rubber (ECO), or a mixture thereof. Since the polar rubber material such as the NBR, ECO or mixture thereof is less likely to be compatible with the thermoplastic resin which will be described later in greater detail, and cooperates with the thermoplastic resin to form an island-sea structure wherein the thermoplastic resin is dispersed in a matrix of the rubber material. Accordingly, the addition of the thermoplastic resin to the rubber composition for the conductive elastic layer 12 effectively avoids a problem such as a decrease of the conductivity of the elastic layer 12.

The thermoplastic resin added to the rubber material provides the effects described above and needs to have crosslinkable double bonds and a melting point in a range from 40° C. to 100° C. If the thermoplastic resin does not have the crosslinkable double bonds, the thermoplastic resin cannot be co-crosslinked with the rubber material upon vulcanization of the rubber material. In this case, the resistance to permanent set of the conductive roll is largely lowered due to the addition of the thermoplastic resin. If such a conductive roll which does not have a high degree of resistance to permanent set is used, the surface pressure at a nip between the conductive roll and the member such as the photosensitive drum with which the conductive roll is held in contact is undesirably increased. In this case, the photosensitive drum cannot be uniformly charged, so that lines undesirably appear as a part of an image reproduced on a sheet of paper in the transverse direction of the sheet. If the melting point of the thermoplastic resin is less than 40° C., ease of handling of the thermoplastic resin is deteriorated under a high temperature condition in a summer season, accordingly deteriorating the workability. If the melting point of the thermoplastic resin exceeds 100° C., the thermoplastic resin is not sufficiently plasticized upon extrusion at an ordinary extrusion temperature in a range from 40° C. to 100° C., so that the rubber composition is not extruded with desired high stability. If the rubber composition is extruded at a high temperature for softening the thermoplastic resin, the surface of the extruded elastic layer 12 may be deteriorated due to scorch, etc. Where the melting point of the thermoplastic resin is held within the range described above, the rubber composition can be effectively extruded with high stability, and the surface of the extruded elastic layer 12 is given a high degree of smoothness. Accordingly, the surface of the conductive elastic layer 12 is given sufficiently high degrees of glossiness and smoothness, for thereby effectively preventing uneven charging of the photosensitive drum. It is particularly preferable that the melting point of the thermoplastic resin is within a range from 50° C. to 90° C.

A specific example of the thermoplastic resin having the crosslinkable double bonds and the melting point of 40° C. to 100° C. is "VESTENAMER 8012" available from Hüls, Germany. Such a commercially available thermoplastic resin is suitably used in the present invention. The "VESTENAMER 8012" is a polyoctenamer having a melting point of about 55° C. and a cis/trans ratio of about 2/8, and can be crosslinked by various kinds of vulcanizing agents such as sulfur, peroxide, phenol resin and quinonedioxime for vulcanizing the rubber.

The thermoplastic resin described above is included in the rubber composition for the conductive elastic layer 12 in an amount of 5 to 50 wt. %, preferably 10 to 30 wt. % of a total amount of the rubber material and the thermoplastic resin. If the amount of the thermoplastic resin is less than 5 wt. %, the effect to be favorably exhibited by the thermoplastic resin cannot be obtained. If the amount of the thermoplastic resin exceeds 50 wt. %, on the other hand, the viscosity of the rubber composition is excessively lowered upon extrusion, that is, the rubber composition is excessively softened upon extrusion, deteriorating formability and geometric stability. In addition, the hardness of the conductive elastic layer 12 obtained by vulcanization is considerably increased. Where a conductive roll whose elastic layer has a considerably high hardness is used, a charging noise may be large or the outer surface of the photosensitive drum with which the conductive roll is held in contact may be chipped, peeled or otherwise damaged.

The conductive agent(s) included in the rubber composition for giving required conductivity to the conductive elastic layer 12 is/are not particularly limited, but may be suitably selected from among known electron-conductive agents and ion-conductive agents which are conventionally included in the rubber composition for the conductive elastic layer 12. Examples of the conductive agent include carbon blacks such as FEF, SRF, Ketjenblack, and acetylene black, metal powders, electrically conductive metal oxides such as c-$TiO_2$ and c-ZnO, and quaternary ammonium salts such as trimethyloctadecyl ammonium perchlorate and benzyltrimethylammonium chloride. At least one conductive agent is suitably selected from among known conductive agents and included in the rubber composition for the conductive elastic layer 12, so that the selected conductive agent(s) is/are dispersed in the conductive elastic layer 12. Owing to the addition of the conductive agent(s), the conductive elastic layer 12 exhibits required conductivity, whereby the volume resistivity of the conductive elastic layer 12 is adjusted to a desired value.

The amount of the conductive agent(s) included in the rubber composition for the conductive elastic layer 12 is suitably determined depending upon the kind of the selected conductive agent(s) such that the conductive elastic layer 12 has a desired volume resistivity value. In general, the volume resistivity of the conductive elastic layer 12 is adjusted to a value in a range from about $10^4$ to $10^{10}$ Ω·cm.

The rubber composition for the conductive elastic layer 12 may further include an electrically insulating filler such as silica, in addition to the components described above. The electrically insulating filler is effective to prevent aggregation of the electron-conductive agent such as the carbon black and improve dispersion of the electron-conductive agent. Owing to the addition of the insulating filler, the surface smoothness of the conductive elastic layer 12 is further improved. As the insulating filler, the silica is advantageously used. The insulating filler may be particles of calcium carbonate or planar particles or fragments of mica or clay. The amount of the insulating filler to be added to the rubber composition is generally held in a range from 20 to 80 parts by weight, preferably in a range from 40 to 60 parts by weight per 100 parts by weight of the total amount of the rubber material and the thermoplastic resin. If the amount of the insulating filler is excessively small, the effect to be favorably exhibited by the insulating filler is not obtained. If the amount of the insulating filler is excessively large, the workability such as ease of extrusion and ease of kneading may be deteriorated.

The rubber composition for the conductive elastic layer 12 further includes a vulcanizing agent and a vulcanizing promoting agent. The rubber composition may further include, as needed, various additives such as a vulcanization promoting aid which includes zinc white and stearic acid, and a softening agent such as process oil. By using the rubber composition including various components described above, the intended conductive elastic layer 12 is formed. Since the present rubber composition for the conductive elastic layer 12 includes the thermoplastic resin described above, the rubber composition can be extruded with high stability, so that the surface of the conductive elastic layer 12 is given sufficiently high degrees of smoothness and glossiness.

The thickness of the conductive elastic layer 12 formed of the rubber composition including the various components described above is generally held in a range from about 0.3 mm to 3 mm from the viewpoint of operation and manufacture. The conductive elastic layer 12 has Asker C hardness generally in a range from 40 to 80.

After the conductive elastic layer 12 is formed, a protective layer 14 is formed, as needed, on the conductive elastic layer 12. The protective layer 14 is provided for preventing the toner from adhering to and accumulating on the surface of the conductive roll. The protective layer 14 is formed, for example, by mixing a nylon material such as N-methoxymethylated nylon or a resin composition material which includes a fluorine-modified acrylate resin, with the conductive agent such as the carbon black or the electrically conductive metal oxide, such that the protective layer 14 has a volume resistivity value in a range from $1\times10^8$ Ω·cm to $1\times10^{13}$ Ω·cm. The thickness of the protective layer 14 is generally held in a range from about 3 μm to 20 μm.

In producing the conductive roll shown in FIG. 1, various known methods may be employed. In the present invention, the conductive elastic layer 12 is formed by extrusion to effectively reduce the required time and cost of manufacture of the conductive roll. More specifically described, the rubber composition for the conductive elastic layer 12 is extruded, by using a cross head extruder, directly on the outer circumferential surface of the shaft body 10. Subsequently, the rubber composition is vulcanized, so that the conductive elastic layer 12 is formed integrally on the outer circumferential surface of the shaft body 10. Thereafter, the protective layer 14 and other layers are formed by a known coating method such as dipping on the outer circumferential surface of the conductive elastic layer 12, such that the protective layer 14 and other layers have respective thickness values. Alternatively, a tubular body formed of the rubber composition for the conductive elastic layer 12 is fabricated by extrusion. After the shaft body 10 is positioned within an inner bore of the tubular body, the tubular body formed of the rubber composition is subjected to vulcanization, so that the conductive elastic layer 12 is formed integrally on the outer circumferential surface of the shaft body 10. Thereafter, the protective layer 14 and other layers are formed by the coating method on the outer circumferential surface of the conductive elastic layer 12, such that the protective layer 14 and other layers have respective thickness values. Thus, the conductive roll having high degrees of surface smoothness and dimensional accuracy is produced. The extrusion may be conducted by a continuous method or a batch method. The extrusion speed is generally 10 to 100 mm/second. The vulcanization is conducted generally in an oven at a temperature of 120 to 180° C. for a time period of 30 to 120 minutes.

The thus constructed conductive roll wherein the conductive elastic layer 12, the protective layer 14, and other layers are formed in the order of description on the shaft body 10 exhibits a low degree of hardness or a high degree of flexibility, and good conductivity owing to the conductive elastic layer 12. In addition, the toner is effectively prevented from adhering to or accumulating on the surface of the roll owing to the protective layer 14.

The present rubber composition for the conductive elastic layer 12 includes, in addition to the conductive agent(s), the suitable amount of the thermoplastic resin having the crosslinkable double bonds and the melting point in a range from 40° C. to 100° C. The conductive roll having the conductive elastic layer 12 formed of the present rubber composition exhibits high degrees of surface smoothness and dimensional accuracy, unlike a conductive roll having a conductive elastic layer formed of a conventional rubber composition. Accordingly, the image reproduced by using the present conductive roll does not suffer from deterioration in the quality due to uneven charging of the photosensitive drum by the conductive roll (due to reduced charging uniformity). The thermoplastic resin is co-crosslinked with the rubber material by the rubber vulcanizing agent such as sulfur, to thereby effectively avoid the problem of deterioration of the resistance to permanent set. Thus, the present conductive roll exhibits an excellent resistance to permanent set.

The conductive roll according to the present invention is advantageously used as a charging roll, a developing roll, a transferring roll, etc.

The conductive roll shown in FIG. 1 includes the protective layer 14 provided on the outer circumferential surface of the conductive elastic layer 12. The structure of the conductive roll is not limited to that shown in FIG. 1, provided that the conductive roll includes at least the conductive elastic layer 12 formed on the outer circumferential surface of the shaft body 10. For instance, the conductive roll may have a single-layer structure which consists of only the conductive elastic layer 12 formed on the outer circumferential surface of the shaft body 10. The conductive roll may have a three-layered structure which consists of the conductive elastic layer 12, the protective layer 14, and a resistance adjusting layer formed therebetween for controlling the electric resistance of the conductive roll to thereby improve the resistance to dielectric breakdown (the resistance to current leakage). Further, the conductive roll may have a laminar structure (multi-layered structure) which includes one or more of layers formed on the conductive elastic layer 12.

It is to be understood that the present invention may be embodied with various changes, modifications and improvements that may occur to those skilled in the art, without departing from the scope of the invention defined in the attached claims.

EXAMPLE

To further clarify the present invention, some examples of the present invention will be described. It is to be understood that the present invention is not limited to the details of these examples.

As a rubber material, NBR ("DN3355" available from NIPPON ZEON CO., LTD., Japan) was prepared. As a thermoplastic resin having the crosslinkable double bonds, polyoctenamer ("VESTENAMER 8012" available from Hüls, Germany and having a melting point of about 55° C.) was prepared. As a conductive agent, carbon black ("THERMAX N990") was used, while silica ("NIPSIL ER") was used as an electrically insulating filler. There were prepared six kinds of rubber compositions for forming respective conductive elastic layers (12), so as to have respective compositions as indicated in the following TABLE 1. The six rubber compositions include the thermoplastic resin according to the present invention, i.e., the thermoplastic resin having the crosslinkable double bonds and the melting point of 40° C. to 60° C., in respective different amounts indicated in the TABLE 1.

Each of the six kinds of rubber compositions was extruded, by using a cross head extruder, directly on an outer circumferential surface of a nickel-plated iron shaft body or core metal (10) having an outside diameter of 6 mm. The outer circumferential surface of the shaft body was coated with a suitable electrically conductive adhesive. In this extruding operation, an extrusion pressure and a die swell value (Dw) were measured. The extrusion pressure and the die swell value Dw measured for each rubber composition are also indicated in the TABLE 1. The die swell value Dw is represented by a ratio of an outside diameter (D') of the extrudate to a diameter (D) of a die, i.e., Dw=D'/D. The thus obtained structure of the precursor roll was heated at 150° C. for 90 minutes for vulcanization. Thus, there were obtained conductive rolls according to the sample Nos. 1 to 6 each having a 2 mm-thick conductive elastic layer (12) formed of a conductive rubber elastic body and provided integrally on the outer circumferential surface of the shaft body (10).

For each of the thus obtained conductive rolls according to the sample Nos. 1 to 6, a resistance to permanent set, a surface condition and an electric resistance were examined in the following manner.

Resistance to Permanent Set

Each of the conductive rolls according to the sample Nos. 1 to 6 was brought into contact with a metallic roll having a diameter of 30 mm such that the axis of the conductive roll was parallel to the axis of the metallic roll. The conductive roll was pressed onto the metallic roll, with a load of 1.5 N applied to each of the axially opposite end portions of the shaft body. The conductive roll was left in this state under the environment of 40° C. and 95% RH for one week. Thereafter, the load acting on the axially opposite end portions of the shaft body was removed. Thirty minutes later, an amount of permanent set was measured for each roll as a difference between the outside diameter of the conductive roll before one-week pressing against the metallic roll and the outside diameter of the conductive roll after one-week pressing against the metallic roll. The resistance to permanent set of each conductive roll was evaluated according to the following criteria:

◎: The amount of permanent set was 0 to 30 μm.
○: The amount of permanent set was 31 to 60 μm.
Δ: The amount of permanent set was 61 to 80 μm.

Surface Condition (Surface Roughness)

The surface condition of the conductive elastic layer of each of the conductive rolls according to The sample Nos. 1 to 6 was evaluated in terms of ten-point mean roughness: Rz, in the following manner. By using a surface roughness measuring device ("SURFCOM 550A" available from TOKYO SEIMITSU CO., LTD., Japan), the surface roughness was measured at three measuring portions, which are spaced from each other in the longitudinal direction of the conductive roll. An average value of the three measured values obtained for each conductive roll is indicated in the TABLE 1. The length of each measuring portion is 0.8 mm.

Electric Resistance of the Conductive Rolls

Figure 2:
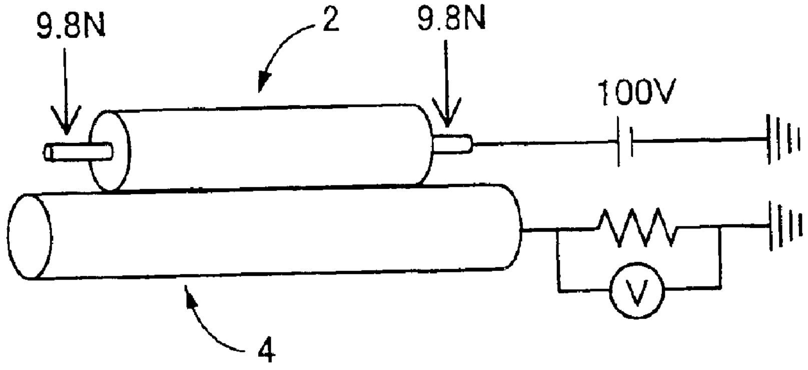
FIG. 2 is a view for explaining a method of measuring an electric resistance of each specimen roll used in EXAMPLE.

The electric resistance of each of the conductive rolls according to the sample Nos. 1 to 6 was measured according to a metallic roll electrode method by using a device as shown in FIG. 2. Described more specifically, a conductive roll 2 was brought into contact with a metallic roll 4 formed of stainless, such that the axis of the conductive roll 2 was parallel to that of the metallic roll 4. The conductive roll 2 was pressed onto the metallic roll, with a load of 9.8 N (1000 gf) applied to each of the axially opposite end portions thereof. In this state, the electric resistance of the conductive roll 2 was measured by applying a voltage of 100V to one of the axially opposite end portions of the conductive roll 2. The measured electric resistance of each conductive roll is indicated in the TABLE 1.

TABLE 1

| | | Sample No. | | | | | |
|---|---|---|---|---|---|---|---|
| | | 1 | 2 | 3 | 4 | 5 | 6 |
| Contents [parts by weight] | NBR | 100 | 96 | 90 | 85 | 80 | 75 |
| | Thermoplastic resin | 0 | 4 | 10 | 15 | 20 | 25 |
| | Carbon black | 5 | 5 | 5 | 5 | 5 | 5 |
| | Silica | 50 | 50 | 50 | 50 | 50 | 50 |
| | Sulfur | 0.5 | 0.5 | 0.5 | 0.5 | 0.5 | 0.5 |
| | Vulcanization promoting agent [DM] | 0.5 | 0.5 | 0.5 | 0.5 | 0.5 | 0.5 |
| | Vulcanization promoting aid [TRA] | 0.5 | 0.5 | 0.5 | 0.5 | 0.5 | 0.5 |
| Resistance to permanent set | Amount of permanent set [μm] | 80 | 72 | 55 | 25 | 20 | 22 |
| | Evaluation | Δ | Δ | ○ | ◎ | ◎ | ◎ |
| Extrusion pressure [MPa] | | 38 | 35 | 30 | 27 | 25 | 20 |
| Die swell value | | 1.80 | 1.75 | 1.70 | 1.40 | 1.30 | 1.33 |
| Surface roughness Rz [μm] | | 22 | 17 | 9 | 3 | 3 | 2.2 |
| Electric resistance [Ω] | | $1.00 \times 10^6$ | $3.00 \times 10^6$ | $3.70 \times 10^6$ | $4.00 \times 10^6$ | $4.50 \times 10^6$ | $4.80 \times 10^6$ |

As is apparent from the results indicated in the TABLE 1, in each of the conductive rolls according to the sample Nos. 3 to 6 wherein the thermoplastic resin, i.e., "VESTENAMER 8012" having the crosslinkable double bonds and the melting point of about 55° C. was included in respective amounts held in the range specified according to the present invention, the extrusion pressure is smaller than those in the conductive rolls according to the sample Nos. 1 and 2 wherein the amounts of the thermoplastic resin, i.e., "VESTENAMER" are smaller than the lower limit of the range specified according to the present invention. Thus, it was confirmed that the rubber composition for each of the conductive rolls according to the sample Nos. 3 to 6 was extruded with high stability. Further, the amount of permanent set and the surface roughness (Rz) in each of the conductive rolls according to the sample Nos. 3 to 6 were smaller than those in the conductive rolls according to the sample Nos. 1 and 2. Accordingly, the conductive rolls according to the sample Nos. 3 to 6 can exhibit high degrees of resistance to permanent set and surface smoothness. The ratio of expansion of the rubber composition upon extrusion decreases with a decrease in the die swell value of the rubber composition, so that the geometric stability of the extruded elastic layer which covers the outer circumferential surface of the core metal tends to increase with the decrease in the die swell value. It is recognized from the results indicated in the above TABLE 1 that the die swell value decreases with an increase in the amount of the thermoplastic resin, i.e., the "VESTENAMER 8012".

In the conductive roll according to the present invention, the conductive elastic layer as a base layer of the roll is formed of the conductive rubber composition obtained by adding, to the rubber material, the suitable amount of conductive agent(s) and the suitable amount of the thermoplastic resin having the crosslinkable double bonds and the melting point of 40° C. to 100° C. Owing to the presence of the thermoplastic resin, the rubber composition for the conductive elastic layer can be extruded with high stability. Further, the present conductive roll exhibits high degrees of surface smoothness, dimensional accuracy, and resistance to permanent set.

In the present invention, the conductive elastic layer is formed by extrusion of the rubber composition including the thermoplastic resin described above. Accordingly, the conductive roll having excellent characteristics such as high degrees of surface smoothness, dimensional accuracy, and resistance to permanent set can be easily produced with improved efficiency and reduced cost of manufacture.

What is claimed is:

1. An electrically conductive roll which includes a shaft body and which includes at least a conductive elastic layer formed by extrusion on an outer circumferential surface of the shaft body, wherein the improvement comprises:

the conductive elastic layer being formed of a conductive rubber composition which includes a rubber material, a thermoplastic resin having crosslinkable double bonds and a melting point in a range from 40° C. to 100° C., and at least one conductive agent, the thermoplastic resin being included in an amount of 5 to 50 wt. % of a total amount of the rubber material and the thermoplastic resin.

2. An electrically conductive roll according to claim 1, wherein the rubber material is selected from the group consisting of a nitrile rubber (NBR), an epichlorohydrin rubber (ECO), and a mixture thereof.

3. An electrically conductive roll according to claim 1, wherein the thermoplastic resin is included in an amount of 10 to 30 wt. % of the total amount of the rubber material and the thermoplastic resin.

4. An electrically conductive roll according to claim 1, wherein the thermoplastic resin has a melting point in a range from 50° C. to 90° C.

5. An electrically conductive roll according to claim 1, wherein the thermoplastic resin is a polyoctenamer having a melting point of about 55° C. and a cis/trans ratio of about 2/8.

6. An electrically conductive roll according to claim 1, wherein the at least one conductive agent is selected from the group consisting of carbon blacks, metal powders, conductive metal oxides, and quaternary ammonium salts.

7. An electrically conductive roll according to claim 1, wherein the conductive rubber composition further includes silica.

8. An electrically conductive roll according to claim 7, wherein the silica is included in an amount of 20 to 80 parts by weight per 100 parts by weight of the total amount of the rubber material and the thermoplastic resin.

9. An electrically conductive roll according to claim 1, wherein the conductive elastic layer has a volume resistivity in a range from $10^4$ Ω·cm to $10^{10}$ Ω·cm.

10. An electrically conductive roll according to claim 1, wherein the conductive elastic layer has a thickness in a range from 0.3 mm to 3 mm.

11. An electrically conductive roll according to claim 1, wherein the conductive elastic layer has Asker C hardness in a range from 40 to 80.

* * * * *